United States Patent
Harris et al.

(10) Patent No.: US 7,251,062 B2
(45) Date of Patent: Jul. 31, 2007

(54) END-OF-TRAVEL FOCUS SHIFT IN AN OPTICAL IMAGE SCANNER

(75) Inventors: Rodney C. Harris, Fort Collins, CO (US); Kevin Youngers, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 988 days.

(21) Appl. No.: 10/370,914

(22) Filed: Feb. 20, 2003

(65) Prior Publication Data

US 2004/0165225 A1 Aug. 26, 2004

(51) Int. Cl.
*H04N 1/04* (2006.01)

(52) U.S. Cl. ............... 358/497; 358/474; 358/486; 358/488

(58) Field of Classification Search ............ 358/497, 358/494, 474, 475, 486, 488, 487, 506, 496, 358/498, 483, 482, 509, 512–514; 382/312, 382/318, 319; 250/234–236, 216, 239, 208.1; 399/211, 212
See application file for complete search history.

(56) References Cited

U.S. PATENT DOCUMENTS

| | | | |
|---|---|---|---|
| 4,059,756 A | 11/1977 | Wilwerding | |
| 4,225,215 A | 9/1980 | Cojan | |
| 5,210,398 A | 5/1993 | Metlitsky | |
| 5,278,677 A | 1/1994 | Lee et al. | |
| 5,362,958 A | 11/1994 | Ando | |
| 5,450,157 A | 9/1995 | Rees | |
| 5,453,784 A | 9/1995 | Krishnan et al. | |
| 5,616,909 A | 4/1997 | Arackellian | |
| 5,736,738 A | 4/1998 | Movaghar et al. | |
| 5,742,326 A | 4/1998 | Matsui et al. | |
| 5,756,981 A | 5/1998 | Roustaei et al. | |
| 5,786,582 A | 7/1998 | Roustaei et al. | |
| 5,878,152 A | 3/1999 | Sussman | |
| 5,898,171 A | 4/1999 | McConica et al. | |
| 5,998,786 A | 12/1999 | Movaghar et al. | |
| 6,037,968 A | 3/2000 | Emge et al. | |
| 6,123,261 A | 9/2000 | Roustaei | |
| 6,188,465 B1 | 2/2001 | Rees et al. | |
| 6,347,163 B2 | 2/2002 | Roustaei | |
| 6,385,352 B1 | 5/2002 | Roustaei | |
| 6,399,937 B1 | 6/2002 | Huang et al. | |
| 6,438,271 B1 | 8/2002 | Usami et al. | |
| 6,512,602 B1 * | 1/2003 | Sheng et al. ............ 358/498 |
| 6,603,580 B1 * | 8/2003 | Taillie ............ 358/474 |
| 7,055,743 B2 * | 6/2006 | Youngers ............ 235/454 |
| 7,119,934 B2 * | 10/2006 | Yoshida et al. ............ 358/487 |
| 2003/0025947 A1 * | 2/2003 | Spears et al. ............ 358/474 |

FOREIGN PATENT DOCUMENTS

| | | |
|---|---|---|
| EP | 0946040 | 9/1999 |
| EP | 1003323 | 5/2000 |
| JP | 63222573 | 9/1988 |
| JP | 11341219 | 12/1999 |

* cited by examiner

*Primary Examiner*—Cheukfan Lee (57) ABSTRACT

End-of-travel focus shift in an optical image scanner is provided. One embodiment is an optical image scanner comprising a platen, a stop member at a first end-of-travel position, and an optical head. The optical head comprises a ramped surface such that when the optical head engages the stop member the distance between the optical head and the platen is adjusted.

20 Claims, 8 Drawing Sheets

END-OF-TRAVEL FOCUS SHIFT IN AN OPTICAL IMAGE SCANNER

BACKGROUND

Optical image scanners, also known as document scanners, convert a visible image (e.g., on a document or photograph, an image in a transparent medium, etc.) into an electronic form suitable for copying, storing, or processing by a computer. An optical image scanner may be a separate device, or an image scanner may be a part of a copier, part of a facsimile machine, or part of a multipurpose device. Reflective image scanners typically have a controlled source of light, and light is reflected off the surface of a document, through an optics system, and onto an array of photosensitive devices (e.g., a charge-coupled device, complimentary metal-oxide semiconductor (CMOS), etc.). Transparency image scanners pass light through a transparent image, for example a photographic positive slide, through optics, and then onto an array of photosensitive devices. The optics focus at least one line, called a scanline, of the image being scanned, onto the array of photosensitive devices. The photosensitive devices convert received light intensity into an electronic signal. An analog-to-digital converter converts the electronic signal into computer readable binary numbers, with each binary number representing an intensity value.

There are two common types of optical image scanners. In a first type, a single spherical reduction lens system is commonly used to focus the scanline onto the photosensor array, and the length of the photosensor array is much less than the length of the scanline. In a second type, an array of many lenses is used to focus the scanline onto the photosensor array, and the length of the photosensor array is the same length as the scanline. For the second type, it is common to use Selfoc® lens arrays, (SLA) (available from Nippon Sheet Glass Co.), in which an array of rod-shaped lenses is used, typically with multiple photosensors receiving light through each individual lens.

Depth of focus refers to the maximum distance that the object position may be changed while maintaining a certain image resolution (i.e., the amount by which an object plane may be shifted along the optical path with respect to some reference plane and introduce no more than a specified acceptable blur). The depth of focus for lens arrays is typically relatively short in comparison to scanners using a single spherical reduction lens system. Typically, flat documents are forced by a cover against a transparent platen for scanning, so depth of focus is not a problem. However, there are some situations in which the surface being scanned cannot be placed directly onto a platen. One example is scanning 35 mm slides. A typical frame for a 35 mm slide holds the surface of the film about 0.7–1.5 mm above the surface of the platen. As a result, slides may be slightly out of focus when using lens arrays that are focused at the surface of the platen. Another example is scanning books or magazines where part of a page being scanned curves into a binding spline, causing part of the surface being scanned to be positioned above the transparent platen. A large depth of focus is needed to sharply image the binding spline.

SUMMARY

Embodiments of the present invention provide end-of-travel focus shift in an optical image scanner.

One embodiment is an optical image scanner comprising a platen, a stop member at a first end-of-travel position, and an optical head. The optical head comprises a ramped surface such that when the optical head engages the stop member the distance between the optical head and the platen is adjusted.

Briefly described, another embodiment is a method of adjusting the location of an object plane above a platen to be scanned by an optical head. One such method comprises translating the optical head such that a slide member is guided along a ramped surface to adjust the distance between the optical head and a platen.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
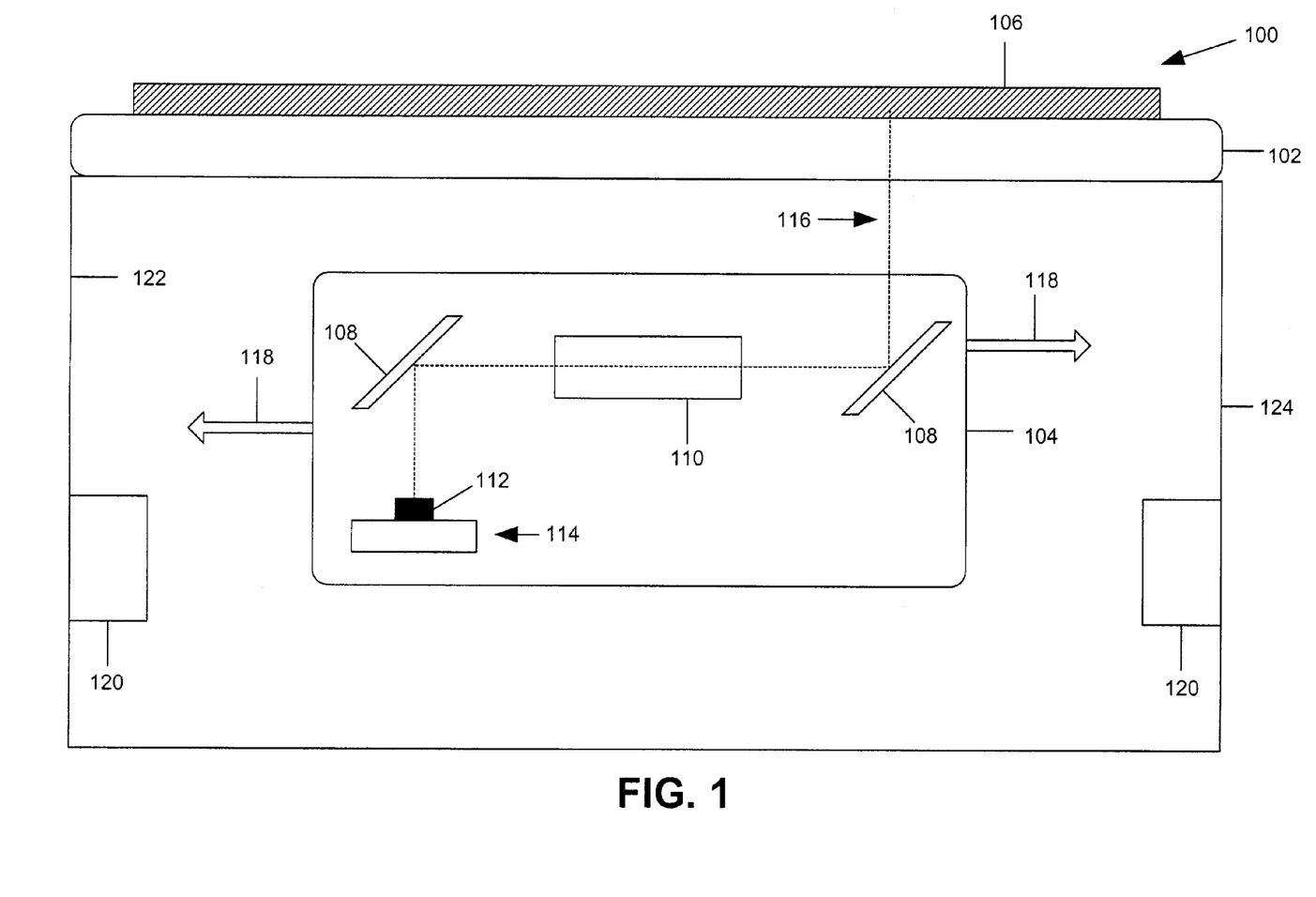
FIG. 1 is a cross-sectional view of an embodiment of an optical image scanner according to the present invention for providing end-of-travel focus shift.

FIG. 1 is a cross-sectional view of an embodiment of an optical image scanner 100, according to the present invention, configured to provide end-of-travel focus shift. The relative sizes of various objects in FIG. 1 are exaggerated to facilitate illustration. As shown in FIG. 1, optical image scanner 100 comprises an optical head 104 (also known as a carriage) positioned relative to a transparent platen 102. As known in the art, a document 106 may be placed on the top surface of the platen 102 for scanning. Optical image scanner 100 may be included within an optical image scanner (e.g., a low profile flatbed scanner), a facsimile machine, copier, etc.

As further illustrated in FIG. 1, optical head 104 comprises a first reflective surface 108 (e.g., mirror, etc.), a lens array 110, a second reflective surface 108, and an image sensor module 114. Image sensor module 114 may comprise, for example, a printed circuit assembly or any other semiconductor device. Image sensor module 114 also includes a photosensor array 112, which may be any type of device configured to receive optical signals and convert the light intensity into an electronic signal. For example, as known in the art, photosensor array 112 may comprise a charge-coupled device (CCD), complimentary metal oxide semiconductor (CMOS), etc.

Lens array 110 may comprise an array of rod-shaped lenses which have a relatively short depth of focus. For example, lens array 110 may comprise a Selfoc® lens array (SLA), which is manufactured and sold by Nippon Sheet Glass Co. of Somerset, N.J. A rod-lens array may comprise at least one row of graded-index micro lenses, which may be equal in dimensions and optical properties. The lenses may be aligned between two fiberglass-reinforced plastic (FRP) plates. Because FRP has a coefficient of thermal expansion equal to glass, thermal distortion and stress effects are minimal. The FRP also increases mechanical strength of the SLA. The interstices may be filled with black silicone to prevent flare (crosstalk) between the lenses and protect each individual lens.

Figure 2:
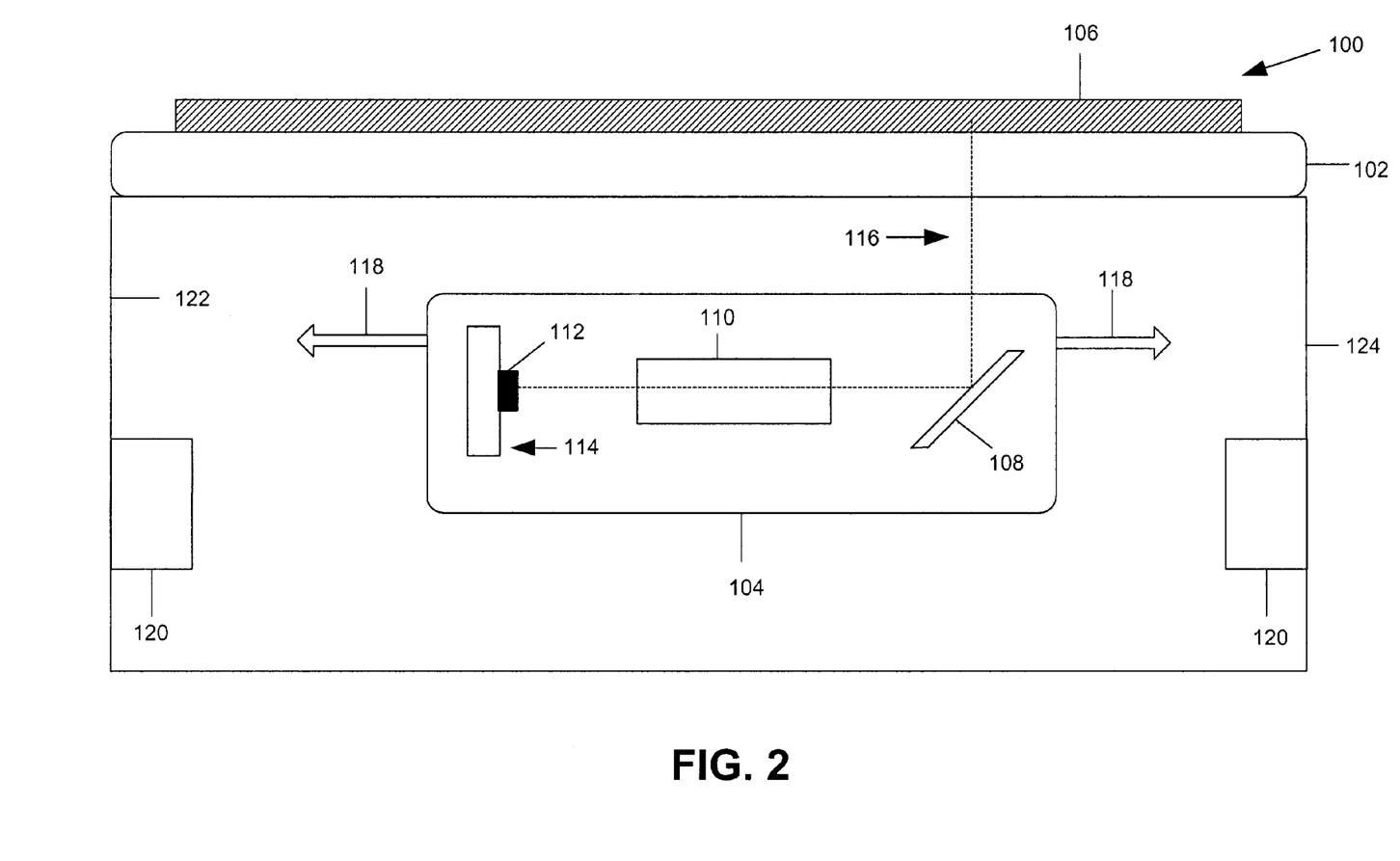
FIG. 2 is a cross-sectional view of another embodiment of an optical image scanner according to the present invention for providing end-of-travel focus shift.

Referring again to FIG. 1, as a document 106 is being scanned by optical head 104, an optical signal 116 is reflected off the document 106 and towards the first reflective surface 108. The first reflective surface 108 directs the optical signal 116 through the lens array 110 to be focused. The optical signal 116 may also be reflected toward image sensor module 114 by a second reflective surface 108. The optical signal 116 is received by photosensor array 112 and converted into an electronic signal, which may be processed by an analog-to-digital converter, digital signal processor, etc. In this manner, the optics within optical head 104 focus a portion of an image of document 106 onto photosensor array 112. As illustrated in FIG. 2, the second reflective surface 108 may be optional. For instance, in order to alter the cross-sectional profile of optical head 104, second reflective surface 108 may be removed and the image sensor module 114 may be oriented perpendicular to the optical axis of lens array 110 to receive optical signal 116. Alternatively, the optical axis of lens array 110 may be oriented perpendicular to platen 102 to direct light through lens array 110 and onto photosensor array 112. The particular orientation of lens array 110 is not relevant to the present invention.

The optical components within optical head 104 focus at least one line (i.e., a scanline) of the image being scanned onto photosensor array 112. As known in the art, scanning of the entire image may be accomplished by translating optical head 104 relative to document 106 (e.g., by using cables) as indicated by reference number 118.

As mentioned above, due to the relatively small depth of focus of lens array 110, existing optical image scanners may produce blurred images of documents 106 that are positioned a small distance above the primary focal point of lens array 110. For example, existing optical image scanners may be configured with the primary focal point at a relatively short distance $H_0$ above the top surface of platen 102. When a document 106, such as a sheet of paper, etc. is positioned on platen 102, it may be located approximately the distance $H_0$ above the top surface of platen 102 or within the relatively small range of the depth of focus. However, if the document 106 is positioned at an object plane that is outside of a range of acceptable focus, existing optical image scanners may produce a blurred image. For instance, various types of documents (or portions of the document) may be located at an object plane outside of the range of acceptable focus when positioned on platen 102 (e.g., 35 mm slides, transparencies, photographs, books, magazines, etc.).

In this regard, various embodiments of optical image scanner 100 according to the present invention enable multiple object planes to be scanned. Optical image scanner 100 provides a means for shifting the primary focal point of lens array 110 relative to the top surface of platen 102. In this manner, optical image scanner 100 may generate focused images of various types of documents 106 positioned at multiple object planes.

Various exemplary systems and methods according to the present invention for shifting the primary focal point of lens array 110 will be described below. However, as an introductory matter, it should be appreciated that optical image scanner 100 shifts the primary focal point of lens array 110 by adjusting the distance between optical head 104 and platen 102 based on the translation of the optical head 104 (reference number 118). In other words, as optical head 104 is translated, the motion of optical head 104 (parallel to the platen 102) may be used to generate orthogonal motion to increase/decrease the distance between optical head 104 and platen 102 and thereby adjust the primary focal point of lens array 110 at another object plane above platen 102. In this manner, the primary focal point of lens array 110 may be adjusted using the same mechanism (e.g., cables, motor, etc.) that is used to translate optical head 104 by, for example, translating the optical head such that a slide member is guided along a ramped surface to adjust the distance between the optical head and platen.

For example, as optical head 104 is translated, it may be lowered relative to platen 102 (i.e., increase the distance between optical head 104 and platen 102), thereby shifting the primary focal point of lens array 110 to another object plane closer to the top surface of platen 102. Furthermore, optical head 104 may be raised relative to platen 102 (i.e., decrease the distance between optical head 104 and platen 102), thereby shifting the primary focal point of lens array 110 to an object plane that is a greater distance from the top surface of platen 102.

Referring again to FIGS. 1 and 2, as a document 106 is being scanned, optical image scanner 100 may be translated along the directions identified by reference number 118—between a first end-of-travel position located near a front wall 122 of optical image scanner 100 and a second end-of-travel position located near a rear wall 124. In accordance with the present invention, the distance between optical head 104 and platen 102 may be adjusted by translating optical head 104 to an end-of-travel position. In this regard, embodiments of optical image scanner 100 may be configured to convert the translation motion (parallel to platen 102) into orthogonal motion to adjust the distance between optical head 104 and platen 102. It should be appreciated that the end-of-travel positions may be located at any two opposing walls. Therefore, the translation motion may be side-to-side, front-to-back, etc.

In the embodiments illustrated in FIGS. 1 and 2, optical image scanner 100 may further comprise a stop member 120 located at an end-of-travel position (e.g., near front wall 122 and/or rear wall 124). In order to adjust the primary focal point of lens array 110, optical head 104 may be translated to the end-of-travel position. As optical head 104 is translated to the end-of-travel position, optical head 104 may engage stop member 120. As described below in more detail, optical head 104 may be configured in a variety of ways so that the engagement of optical head 104 and stop member 120 causes optical head 104 to be raised/lowered relative to platen 102, thereby shifting the primary focal point of lens array 110 relative to the top surface of platen 102.

In some embodiments, stop member 120 may comprise the wall, while in other embodiments, stop member 120 may be a separate member that is built into or attached to the wall.

Furthermore, it should be appreciated that a pair of stop members 120 may be used a first stop member 120 located at the end-of-travel position near front wall 122 and a second stop member 120 located at the end-of-travel position near rear wall 124. As optical head 104 is translated to the end-of-travel position (e.g., located near front wall 122), optical head 104 is raised relative to platen 102 (i.e., the primary focal point of lens array 110 is shifted to a greater distance above platen 102). As optical head 104 is translated to the other end-of-travel position (e.g., located near rear wall 124), optical head 104 may be lowered relative to platen 102 (i.e., the primary focal point of lens array 110 is shifted closer to the top surface of platen 102).

One of ordinary skill in the art will appreciate that optical image scanner 100 may be configured with a single stop member 120 at one end-of-travel position. In this regard, the primary focal point of lens array 110 may be "toggled" at a single end-of-travel position. For example, the first time optical head 104 is translated to the stop member 120, the optical head 104 may be raised; the second time optical head 104 may be lowered. Furthermore, the amount optical 104 is raised/lowered may be dependent on the amount of distance optical head 104 is translated at the end-of-travel position.

It should be further appreciated that stop member 120 and optical head 104 need not engage each other during a normal scan procedure. Rather, in some embodiments, the engagement of stop member 120 and optical head 104 may be initiated/controlled when the distance between optical head 104 and platen 102 is to be adjusted (i.e., focal point of lens array 110 adjusted). In this manner, optical image scanner 100 may be configured with at least two scanning modes. For example, optical image scanner 100 may have a default scan mode (i.e., a default distance between optical head 104 and platen 102). Optical image scanner 100 may scan in this mode as desired. However, optical image scanner 100 may be switched to another scan mode by translating optical head 104 to an end-of-travel position and engaging stop member 120 such that the optical head 104 is raised/lowered. Then, optical image scanner 100 may scan an object (e.g., document 106) in this mode as desired. It should be appreciated that optical image scanner 100 may be switched back to the default scan mode or a further scan mode by translating optical head 104 to either end-of-travel position.

Figure 3:
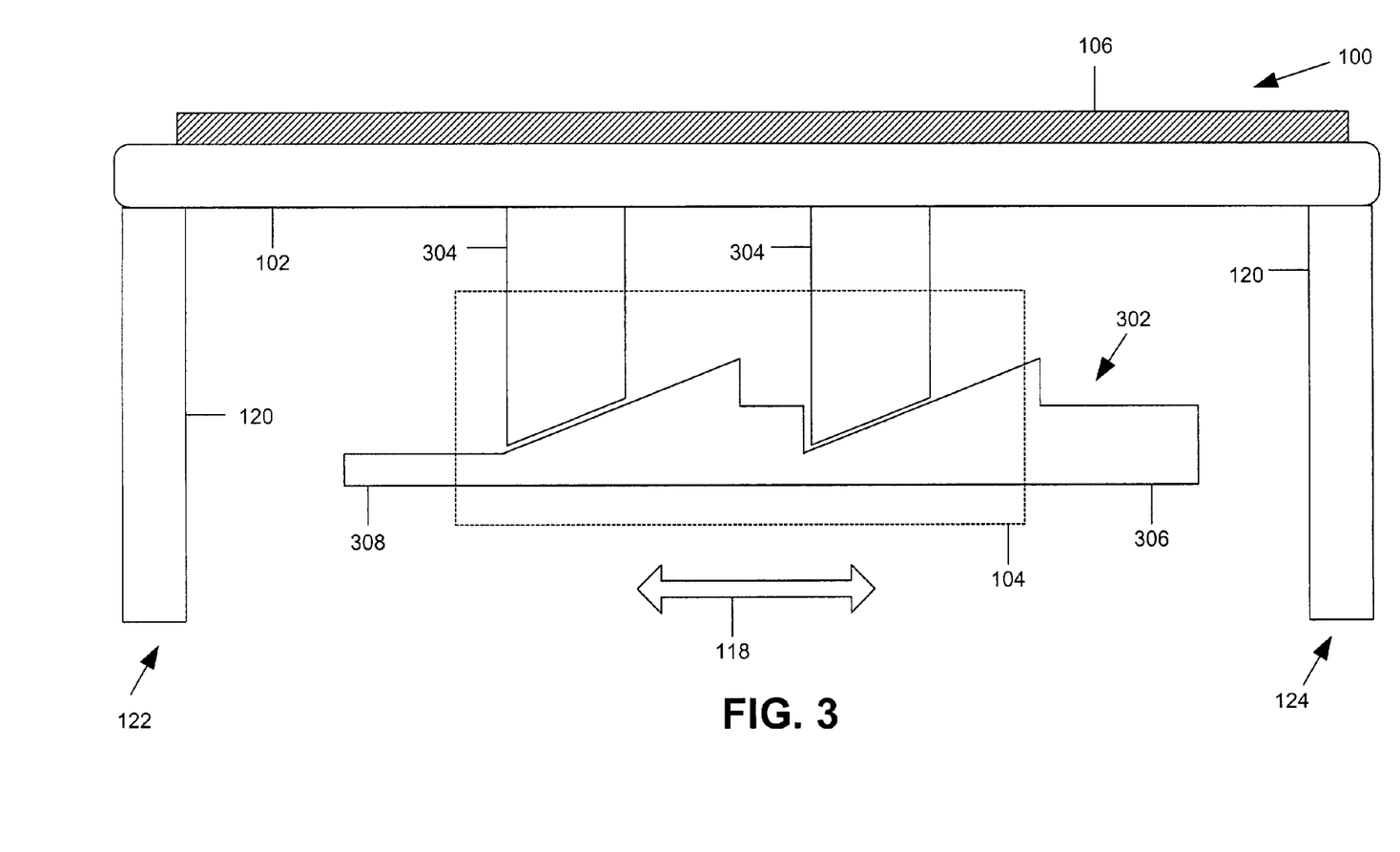
FIG. 3 is a cross-sectional view of an embodiment of an optical head such as shown in FIGS. 1 and 2 for providing end-of-travel focus shift.

A number of mechanisms may be employed to convert the translation motion (parallel to platen 102) into orthogonal motion to raise/lower optical head 102. Referring to FIGS. 3–8, several exemplary mechanisms will be described. As illustrated in FIG. 3, optical head 104 may further comprise at least one slide member 304 and an adjustment member (e.g., push-rod member 302). Push-rod member 302 may comprise end portions 306 and 308 that extend from sides of optical head 104. For example, end portion 306 may extend from a housing of optical head 104 toward stop member 120 located at the end-of-travel position at rear wall 124. End portion 308 may extend from a housing of optical head 104 toward stop member 120 located at the end-of-travel position at front wall 122. Push-rod member 302 may further comprise an interior portion (between end portions 306 and 308), which includes a ramped surface. Although two ramped surfaces are illustrated in the Figures, the interior portion of push-rod member 302 may include one or more ramped surfaces depending on, for example, the number of slide member(s) 304 being employed. It should be appreciated that push-rod member 302 slides horizontally within optical head 104.

As further illustrated in FIG. 3, slide member(s) 304 are positioned so that a top portion extends from the top of optical head 104 and engages the lower surface of platen 102, and a lower portion engages the interior portion of push-rod member 302. In this manner, the distance between optical head 104 and the lower surface of platen 102 may be controlled based on the lateral movement of slide member(s) 304 relative to the ramped surface of push-rod member 302. For example, optical head 104 may be raised relative to platen 102 (i.e., shift the primary focal point of lens array 110 to a new object plane further above platen 102) by moving slide member 304 down the ramped surface. Optical head 104 may be lowered relative to platen 102 (i.e., shift the primary focal point of lens array 110 to a new object plane closer to platen 102) by moving slide member 304 up the ramped surface.

Slide member(s) 304 may be configured in a number of ways. As illustrated in FIG. 3, slide member(s) 304 may comprise a rectangular-shaped member having a sloped lower surface to engage the ramped surface of push-rod member 302. It should be appreciated that slide members 304 are horizontally fixed relative topical head 104. Furthermore, slide members 304 are rigid such that their vertical height does not appreciably vary during operation. In alternative embodiments, slide member(s) 304 may comprise a roller, bushing, sphere, etc. (FIGS. 6–8) to reduce the friction between slide member 304 and platen 102 and push-rod member 302. It should be noted that, in this embodiment, slide member(s) 304 are restrained from moving laterally with respect to optical head 104. Slide member (s) 304, however, may move vertically relative to optical head 104 (e.g., through an aperture in optical head 104 In this manner, slide member(s) 304 are translated together with optical head 104 and driven up/down the ramped surface of push-rod member 302.

Figure 4:
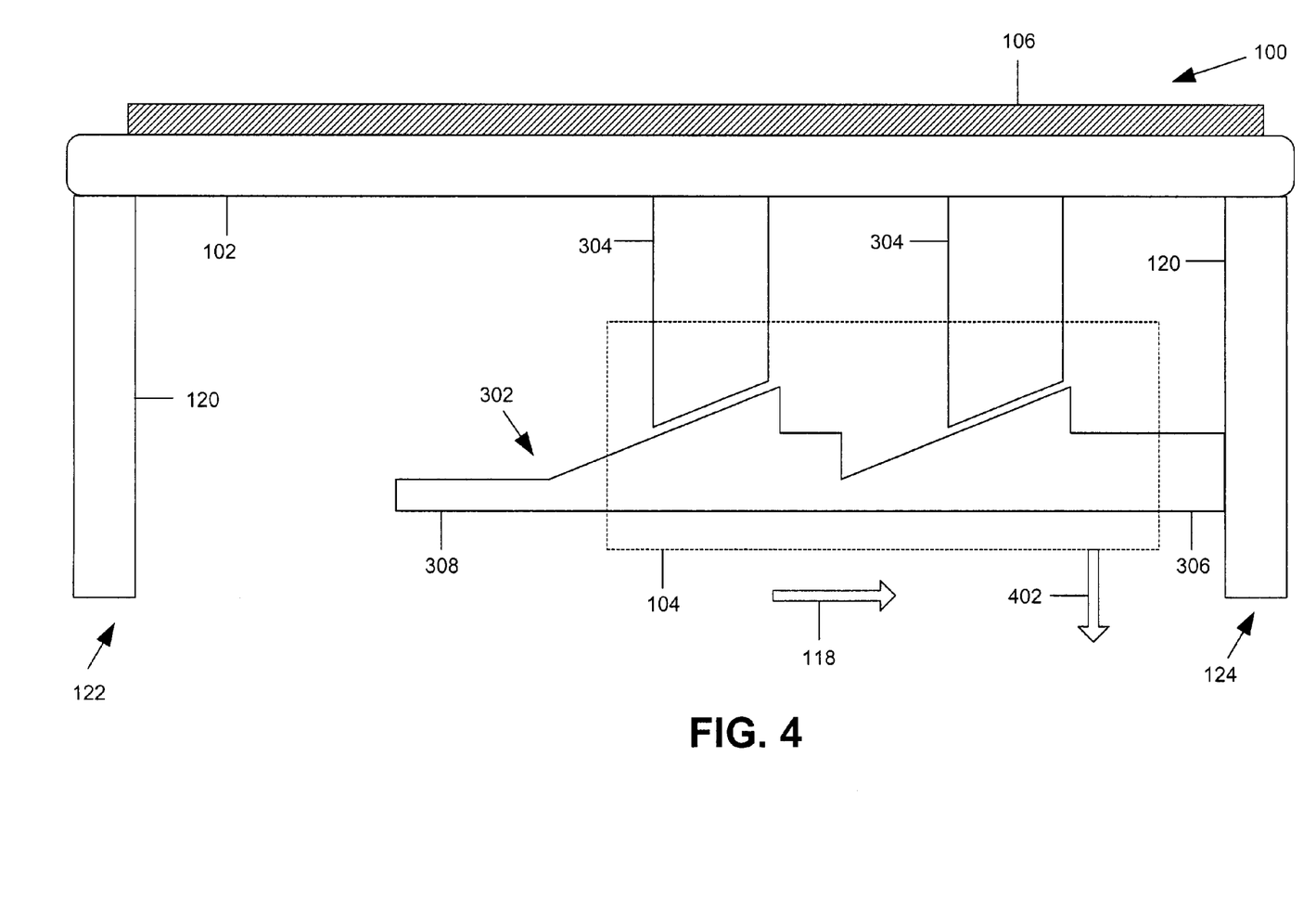
FIG. 4 is a cross-sectional view of the optical head of FIG. 3 being translated to an end-of-travel position to increase the distance between the optical head and the platen.
Figure 5:
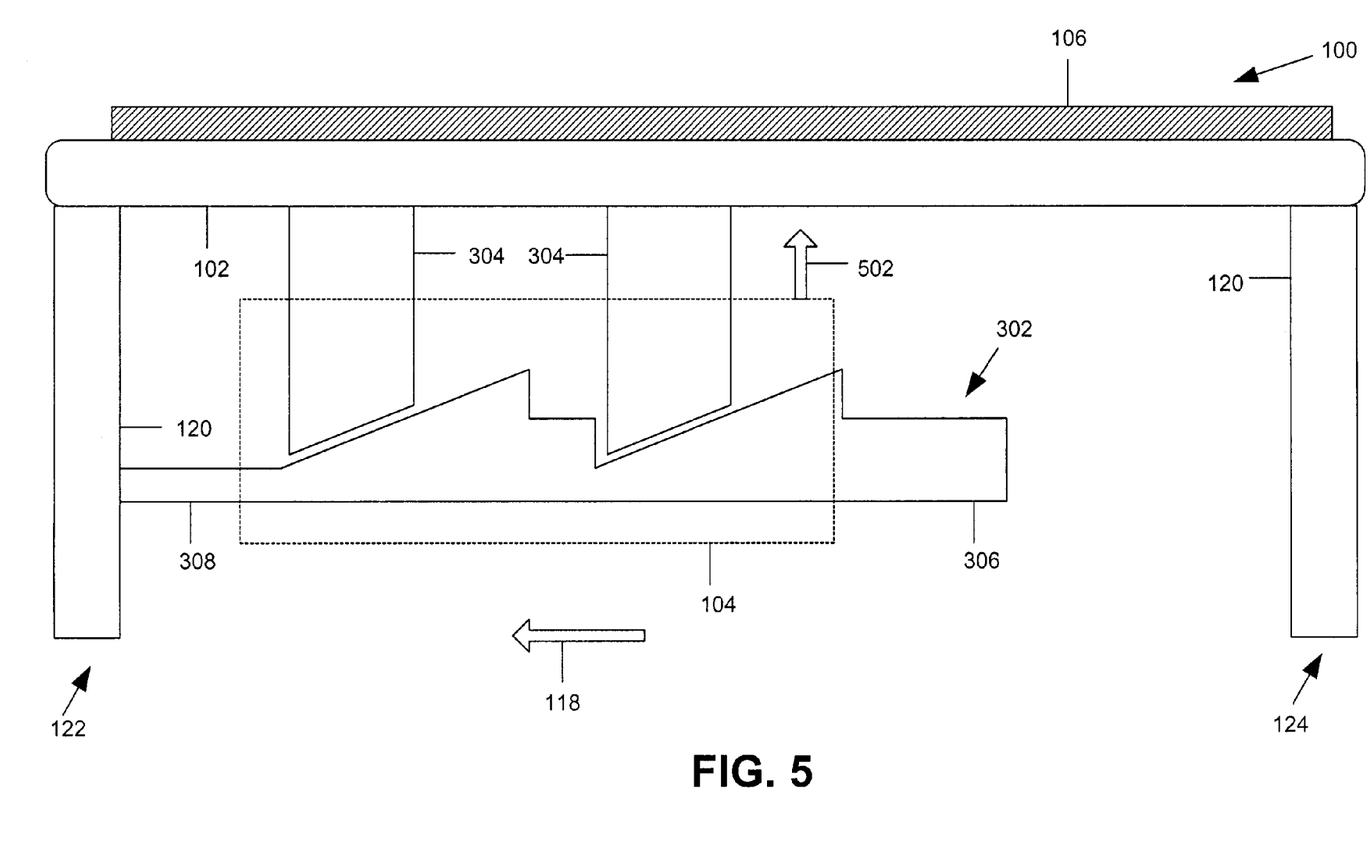
FIG. 5 is a cross-sectional view of the optical head of FIG. 3 being translated to an end-of-travel position to decrease the distance between the optical head and the platen.

As mentioned above, optical image scanner 100 may be configured with two or more scanning modes. In the embodiment illustrated in FIG. 3, optical image scanner 100 is in a default scan mode. FIG. 4 illustrates optical image scanner 100 being switched from the default scan mode to another scan mode. FIG. 5 illustrates optical image scanner 100 being switched back to the default scan mode.

With reference to FIGS. 4 and 5, the operation of an embodiment of optical image scanner 100 will be described. FIG. 4 illustrates optical head 104 being translated to the end-of-travel position at rear wall 124. At this end-of-travel position, optical head 104 may be lowered relative to platen 102 to shift the primary focal point of lens array 110 to a new object plane closer to the surface of platen 102.

As illustrated in FIG. 4, when optical head 104 reaches the end-of-travel position at rear wall 124, end portion 306 of push-rod member 302 engages stop member 120. This action prevents push-rod member 302 from being further translated. However, as optical head 104 is further translated, slide member(s) 304 are guided up the ramped surface (s) of push-rod member 302 (from the position in FIG. 3 to the position in FIG. 4). As slide member(s) 304 move laterally up the ramped surface of push-rod member 302, push-rod member 302 and optical head 104 are forced downward (indicated by reference number 402). In this manner, the primary focal point of lens array 110 is shifted to a new object plane located closer to the upper surface of platen 102.

FIG. 5 illustrates optical head 104 being translated to the end-of-travel position at front wall 122. At this end-of-travel position, optical head 104 may be raised relative to platen 102 to shift the primary focal point of lens array 110 to a new object plane located a greater distance above the surface of platen 102. As illustrated in FIG. 5, when optical head 104 reaches the end-of-travel position at front wall 122, end portion 308 of push-rod member 302 engages stop member 120. This action prevents push-rod member 302 from being further translated. However, as optical head 104 is further translated, slide member(s) 304 are guided down the ramped surface(s) of push-rod member 302 (from the position In FIG. 4 to the position in FIG. 5). As slide member(s) 304 moves laterally down the ramped surface(s) of push-rod member 302. push-rod member 302 and optical head 104 are forced upward (indicated by reference number 502). In this regard, it should be appreciated that optical head 104 may be spring-loaded from the bottom. In other words, slide member(s) 304 may be held against the lower surface of platen 102 by applying a small amount of upward force on optical head 104 (e.g., via a spring, etc.). Therefore, as slide member(s) 304 moves down the ramped surface of push-rod member 302, the upward force vertically shifts optical head 104 closer to platen 102. In this manner, the primary focal point of lens array 110 Is shifted to a new object plane located a greater distance above the upper surface of platen 102.

In alternative embodiments, a notch, step, or detent may be provided on the ramped surface of push-rod member 302 to prevent member(s) 304 from sliding down the ramped surface. Furthermore, the lower portion of slide member(s) 304 (which engages the ramped surface) may be configured in a variety of alternative ways to increase/decrease friction.

Figure 6:
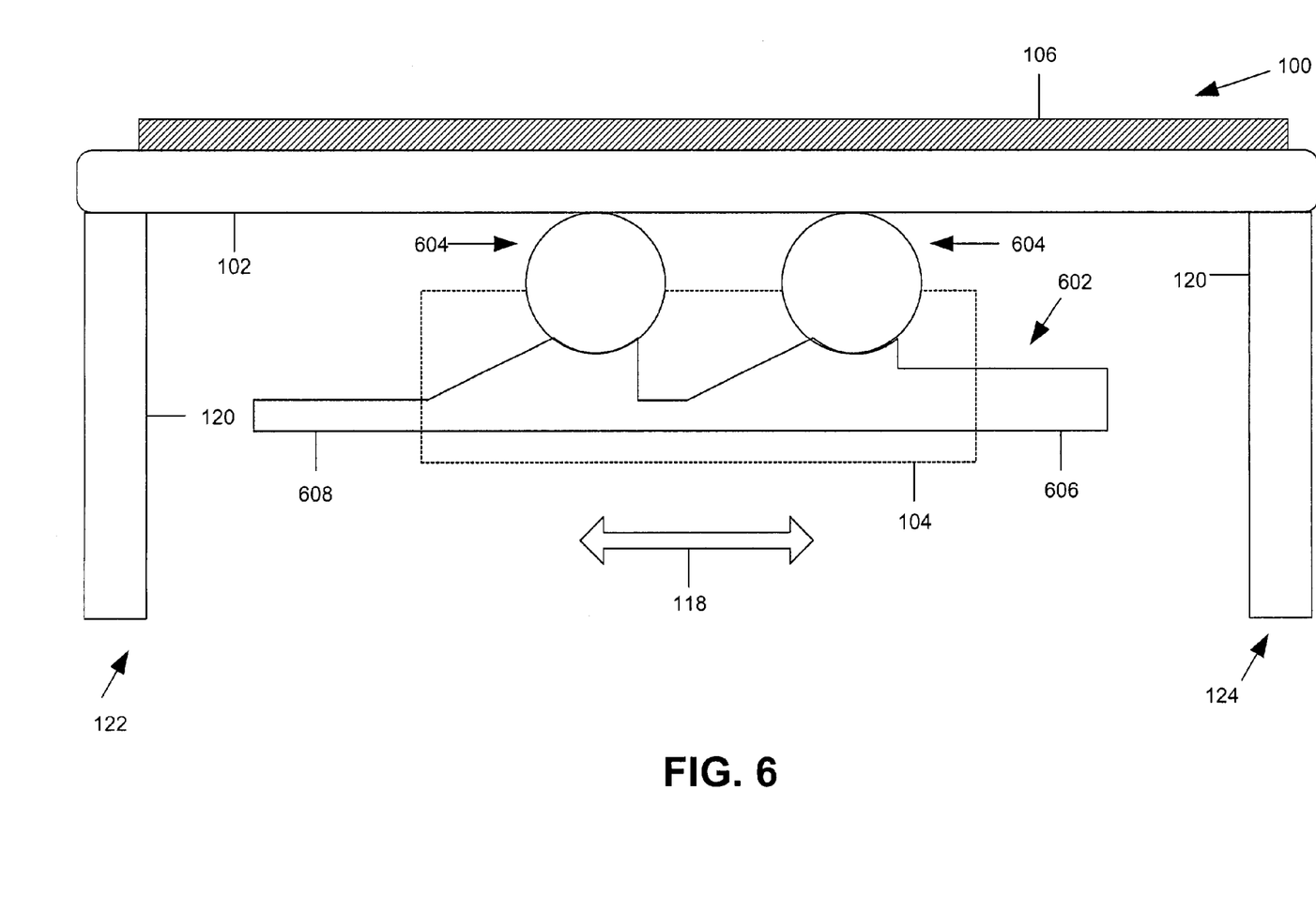
FIG. 6 is a cross-sectional view of another embodiment of the optical head of FIGS. 1 and 2 for providing end-of-travel focus shift.
Figure 7:
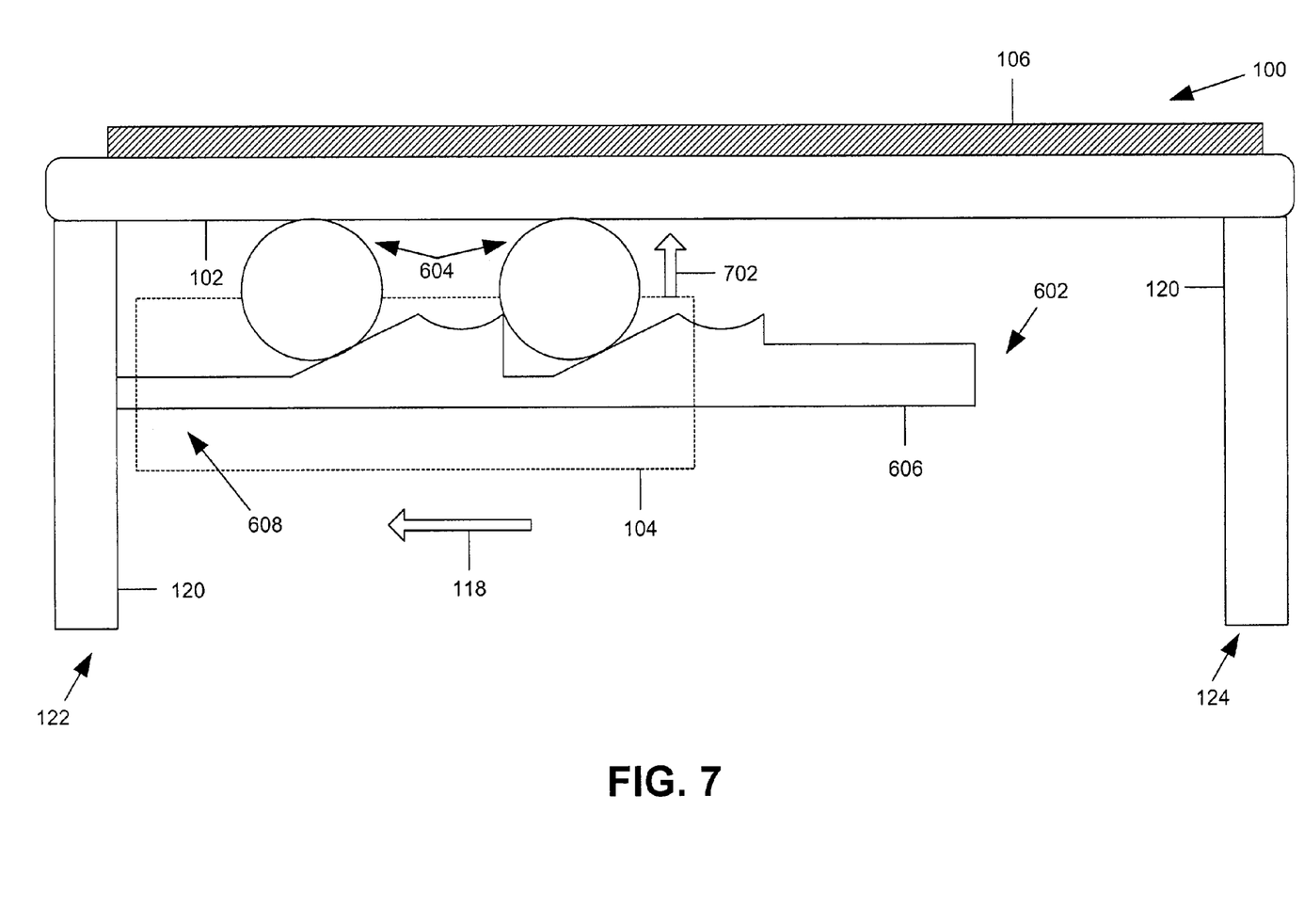
FIG. 7 is a cross-sectional view of the optical head of FIG. 6 being translated to an end-of-travel position to decrease the distance between the optical head and the platen.
Figure 8:
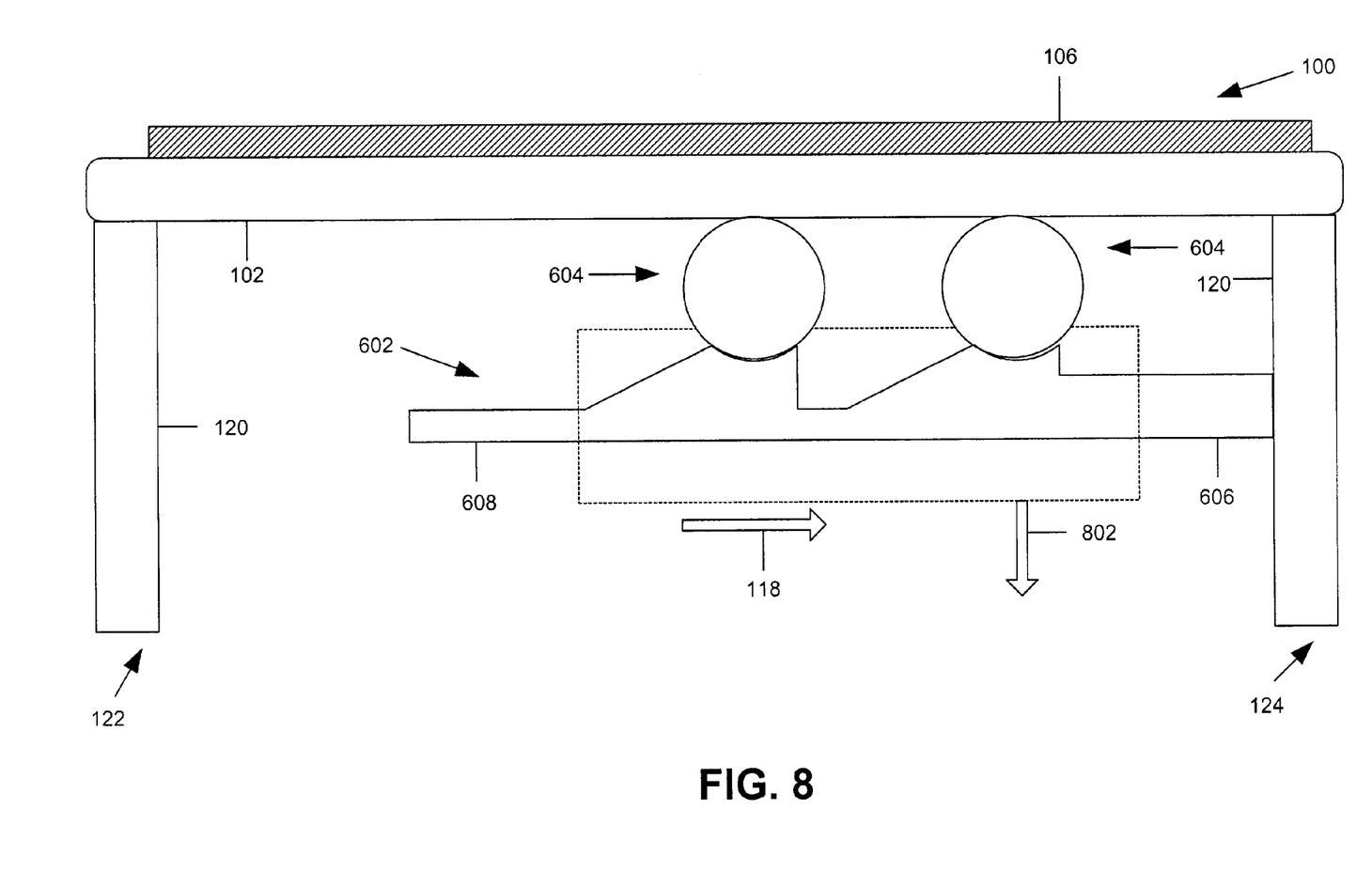
FIG. 8 is a cross-sectional view of the optical head of FIG. 6 being translated to an end-of-travel position to increase the distance between the optical head and the platen.

It should be appreciated that push-rod member 302 and slide member(s) 304 may be configured in a variety of alternative ways. For example, as illustrated in FIGS. 6–8, the slide member(s) comprises roller(s) 604 to reduce friction with platen 102 and the push-rod member. In this embodiment, push-rod member 602 may be configured with ledges or "detent" notches to receive slide members 604 (FIG. 6 and 8). FIG. 7 illustrates optical head 104 being translated to the end-of-travel position at front wall 122. At this end-of-travel position, optical head 104 is raised relative to platen 102 to shift the primary focal point of lens array 110 to a new object plane located a greater distance above the surface of platen 102. As illustrated in FIG. 7, when optical head 104 reaches the end-of-travel position at front wall 122, end portion 608 of push-rod member 602 engages stop member 120. This action prevents push-rod member 602 from being further translated. However, as optical head 104 is further translated, slide members 604 are disengaged from the ledges and guided down the ramped surface(s) of push-rod member 602 (from the position in FIG. 6 to the position in FIG. 7). As slide member(s) 604 move laterally down the ramped surface of push-rod member 602, push-rod member 602 and optical head 104 are forced upward (indicated by reference number 702). In this manner, the primary focal point of lens array 110 is shifted to a new object plane located a greater distance above the upper surface of platen 102.

FIG. 8 illustrates optical head 104 being translated to the end-of-travel position at rear wall 124. At this end-of-travel position, optical head 104 is lowered relative to platen 102 to shift the primary focal point of lens array 110 to a new object plane closer to the top surface of platen 102. As illustrated in FIG. 8, when optical head 104 reaches the end-of-travel position at rear wall 124, end portion 606 of push-rod member 602 engages stop member 120. This action prevents push-rod member 602 from being further translated. However, as optical head 104 is further translated, slide members 604 are guided up the ramped surface of push-rod member 602 (from the position in FIG. 6 to the position in FIG. 7) and received in the ledges. As slide member(s) 604 moves laterally up the ramped surface of push-rod member 602, push-rod member 602 and optical head 104 are forced downward (indicated by reference number 802). In this manner, the primary focal point of lens array 110 is shifted to a new object plane located closer to the upper surface of platen 102.

Therefore, having thus described the invention, at least the following is claimed:

1. An optical image scanner comprising:
    a platen;
    a stop member at a first end-of-travel position; and
    an optical head comprising a ramped surface such that when the optical head engages the stop member the distance between the optical head and the platen is adjusted.

2. The optical image scanner of claim 1, wherein the stop member is positioned below a lower surface of the platen.

3. The optical image scanner of claim 2, wherein the optical head further comprises:
    a housing;
    a slide member having a top portion extending from the housing and engaging the lower surface of the platen: and
    an adjustment member comprising an interior portion having the ramped surface and an end portion extending from a first side of the housing toward the stop member;
    wherein the ramped surface engages a lower portion of the slide member such that when the optical head is translated toward a first end-of-travel position the end portion engages the stop member and the slide member is guided along the ramped surface.

4. The optical image scanner of claim 3, wherein the adjustment member comprises a push-rod.

5. The optical image scanner of claim 3, wherein the optical head is spring-loaded such that the slide member is held against the platen.

6. The optical image scanner of claim 3, wherein the slide member comprises a slide bushing.

7. The optical image scanner of claim 3, wherein the top portion of the slide member comprises a flat surface that engages the lower surface of the platen.

8. The optical image scanner of claim 3, wherein the lower portion of the slide member engages the ramped surface.

9. The optical image scanner of claim 3, wherein the slide member is guided up the ramped surface to increase the distance between the optical head and the platen.

10. The optical image scanner of claim 3, further comprising a second stop member positioned below a lower surface of the platen at a second end-of-travel position.

11. The optical image scanner of claim 10, wherein the adjustment member further comprises a second end portion extending from a second side of the housing toward the second stop member.

12. The optical image scanner of claim 3, wherein the slide member is guided down the ramped surface to decrease the distance between the optical head and the platen.

13. A method of adjusting the location of an object plane above a platen to be scanned by an optical head, the method comprising:
    translating the optical head such that a slide member is guided along a ramped surface to adjust the distance between the optical head and the platen;
    translating the optical head toward a first end-of-travel position; and engaging an adjustment member with a stop member located at the first end-of-travel position such that the adjustment member is no longer translated.

14. A method of adjusting the location of an object plane above a platen to be scanned by an optical head, the method comprising:
translating the optical head such that a slide member is guided along a ramped surface to adjust the distance between the optical head and the platen;
wherein the translating further comprises translating the optical head such that the slide member is guided down the ramped surface to decrease the distance between the optical head and the platen.

15. A method of adjusting the location of an object plane above a platen to be scanned by an optical head, the method comprising:
translating the optical head such that a slide member is guided along a ramped surface to adjust the distance between the optical head and the platen;
wherein the translating the optical head comprises further comprising translating the optical head such that the slide member is guided up the ramped surface to increase the distance between the optical head and the platen.

16. The method of claim 15, further comprising:
translating the optical head toward a second end-of-travel position;
engaging the adjustment member with a second stop member located at the second end-of-travel position such that the push-rod member is no longer translated.

17. A method of adjusting the location of an object plane above a platen to be scanned by an optical head, the method comprising:
translating the optical head such that a slide member is guided along a ramped surface to adjust the distance between the optical head and the platen; and
engaging an optical head having a ramped surface with a stop member to adjust the distance between the optical head and the platen.

18. An optical image scanner comprising:
a platen;
a stop member at an end-of-travel position; and
an optical head having a ramp member that causes the optical head to move in an orthogonal direction relative to the platen when the optical head is translated into the stop member.

19. The optical image scanner of claim 18, wherein the optical head further comprises:
a housing;
a slide member having a top portion extending from the housing and engaging the lower surface of the platen; and
an adjustment member having a first end portion extending from a first side of the housing toward the stop member and an interior portion having a ramped surface that engages the lower portion of the slide member such that when the optical head is translated toward the first end-of-travel position the first end portion engages the stop member and the slide member is guided along the ramped surface to adjust the distance between the optical head and the platen.

20. The optical image scanner of claim 19, wherein the adjustment member comprises a push-rod.

* * * * *

UNITED STATES PATENT AND TRADEMARK OFFICE
CERTIFICATE OF CORRECTION

PATENT NO. : 7,251,062 B2 Page 1 of 1
APPLICATION NO. : 10/370914
DATED : July 31, 2007
INVENTOR(S) : Rodney C. Harris et al.

It is certified that error appears in the above-identified patent and that said Letters Patent is hereby corrected as shown below:

In column 8, line 22, in Claim 3, after "platen" delete ":" and insert -- ; --, therefor.

Signed and Sealed this

Fifth Day of May, 2009

JOHN DOLL
*Acting Director of the United States Patent and Trademark Office*